United States Patent
Agirman

(10) Patent No.: US 10,381,968 B2
(45) Date of Patent: Aug. 13, 2019

(54) CONVERTER PULSE WIDTH MODULATION STRATEGIES FOR THREE PHASE REGENERATIVE DRIVES

(71) Applicant: OTIS ELEVATOR COMPANY, Farmington, CT (US)

(72) Inventor: Ismail Agirman, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/832,216

(22) Filed: Dec. 5, 2017

(65) Prior Publication Data

US 2019/0173410 A1 Jun. 6, 2019

(51) Int. Cl.
*H02P 11/04* (2006.01)
*H02P 27/08* (2006.01)
(Continued)

(52) U.S. Cl.
CPC .............. *H02P 27/085* (2013.01); *H02P 3/14* (2013.01); *H02P 27/16* (2013.01)

(58) Field of Classification Search
CPC .......... H02P 27/08; H02P 27/06; H02P 21/22; H02P 6/182; H02P 27/047
See application file for complete search history.

(56) References Cited

U.S. PATENT DOCUMENTS 4,328,454 A * 5/1982 Okuyama ................ H02P 23/06
318/803
5,153,821 A 10/1992 Blasko
(Continued)

FOREIGN PATENT DOCUMENTS

CN 102904523 A 1/2013
CN 103986319 A 8/2014

OTHER PUBLICATIONS

Julian Felix Wölfle et al.; "A hybrid discontinuous modulation technique to influence the switching losses of three phase inverters"; Institute for Power Electronics and Electrical Drives University of Stuttgart; Published in: Power Electronics and Applications (EPE'15 ECCE-Europe), 2015 17th European Conference—Date of Conference: Sep. 8-10, 2015; Date Added to IEEE Xplore: Oct. 29, 2015; 13 pgs.

(Continued)

*Primary Examiner* — Bentsu Ro
(74) *Attorney, Agent, or Firm* — Cantor Colburn LLP

(57) ABSTRACT

A three-phase regenerative drive employing multiple converter pulse width modulation (PWM) strategies. The drive includes a three-phase converter having inputs for connection to a three-phase AC source, the three-phase converter having three phase legs, a DC bus operably connected to the three-phase converter wherein the three phase converter is configured to direct current from the three-phase AC source to the DC bus, and a three-phase inverter operably connected to the DC bus and a motor, the three phase inverter configured to draw current from the DC bus and provide three phase command signals to the motor. The three-phase converter employs a first PWM strategy to supply current to the DC bus, and the converter employs a second PWM strategy to supply current to the DC bus if a total current in the three phase legs exceeds a selected threshold.

22 Claims, 4 Drawing Sheets

(51) Int. Cl.
*H02P 3/14* (2006.01)
*H02P 27/16* (2006.01)
*H02P 11/00* (2006.01)

(56) References Cited

U.S. PATENT DOCUMENTS

| | | | |
|---|---|---|---|
| 5,706,186 | A | 1/1998 | Blasko |
| 6,023,417 | A | 2/2000 | Hava et al. |
| 6,058,031 | A | 5/2000 | Lyons et al. |
| 6,819,078 | B2 | 11/2004 | Ho |
| 7,042,194 | B1 * | 5/2006 | Kuroiwa ............... H02P 6/00 318/722 |
| 7,190,143 | B2 | 3/2007 | Wei et al. |
| 7,307,401 | B2 | 12/2007 | Gataric et al. |
| 7,391,181 | B2 | 6/2008 | Welchko et al. |
| 7,518,335 | B2 | 4/2009 | West et al. |
| 7,679,310 | B2 | 3/2010 | Schulz et al. |
| 7,880,426 | B2 | 2/2011 | Vilain et al. |
| 7,999,503 | B2 | 8/2011 | Kowalewski et al. |
| 8,125,805 | B1 | 2/2012 | Melanson |
| 8,222,857 | B2 | 7/2012 | Kitanaka |
| 8,348,020 | B2 | 1/2013 | Ohya et al. |
| 8,503,207 | B2 | 8/2013 | Tallam et al. |
| 8,536,818 | B2 | 9/2013 | Schulz et al. |
| 8,631,908 | B2 | 1/2014 | Schroeder-Brumloop et al. |
| 9,054,586 | B2 | 6/2015 | Wei et al. |
| 9,190,896 | B2 | 11/2015 | Chen et al. |
| 9,236,828 | B1 | 1/2016 | Wei et al. |
| 9,371,010 | B2 | 6/2016 | Holmes et al. |
| 9,654,028 | B1 | 5/2017 | Luo et al. |
| 9,712,055 | B1 | 7/2017 | Swartz et al. |
| 9,716,444 | B2 | 7/2017 | Wagoner et al. |
| 9,762,173 | B2 | 9/2017 | Ochs et al. |
| 2007/0268051 | A1 | 11/2007 | Kerkman et al. |
| 2010/0008114 | A1 | 1/2010 | Lee et al. |
| 2011/0208360 | A1 | 8/2011 | Oggianu et al. |
| 2011/0247900 | A1 * | 10/2011 | Blasko ............... B66B 1/302 187/247 |
| 2013/0193897 | A1 | 8/2013 | Iwashita et al. |
| 2013/0264974 | A1 | 10/2013 | Suzuki |
| 2016/0118925 | A1 * | 4/2016 | Kim ............... B60L 7/14 318/139 |
| 2016/0254771 | A1 | 9/2016 | Qiao et al. |
| 2016/0311645 | A1 | 10/2016 | Agirman et al. |
| 2017/0237420 | A1 | 8/2017 | Lindemann et al. |

OTHER PUBLICATIONS

Ahn, Han-woong, et al., Hybrid Pulse Width Modulation Strategy for Wide Speed Range in IPMSM with Low Cost Drives, J. Elect. Eng. Technol .2016; 11(3): 670-674 (5 pp).

Bhavani, J., et al., Hybrid Pulse Width Modulation Method for VSI Fed Induction Motor Drive with Reduced Complexity, International Journal of Engineering Research and Development, vol. 2, Issue 6 (Aug. 2012), pp. 42-50 (9 pp).

Di Zhao et al.; "Space-Vector-Based Hybrid Pulsewidth Modulation Techniques for Reduced Harmonic Distortion and Switching Loss"; IEEE Transactions on Power Electronics, vol. 25, No. 3, Mar. 2010; pp. 760-774; 15 pgs.

European Search Report for application 18210188.1, dated Apr. 11, 2019, 8 pages.

* cited by examiner

CONVERTER PULSE WIDTH MODULATION STRATEGIES FOR THREE PHASE REGENERATIVE DRIVES

TECHNICAL FIELD

The subject matter disclosed herein relates generally to conveyance systems, and more particularly to a conveyance system having regenerative three phase drives selectively employing multiple pulse width modulation (PWM) techniques to control an active converter.

BACKGROUND

Electric motors are well known and widely used. They come in a variety of sizes and styles. One example use of an electric motor is in an elevator machine that moves a drive sheave for propelling an elevator cab up or down through a hoistway, for example. Another use for an electric motor in a heating ventilation, air conditioning or refrigeration systems (HVACR).

Recently, regenerative drive machines have been introduced particularly into elevator systems. Regenerative drive machines include an electric motor that draws power from a power source for purposes of moving a car and counterweight through a hoistway in a first direction and generates power that is provided back to the power source when allowing the car and counterweight to move in an opposite direction. The regenerative drives take advantage of the ability of an electric motor to act as a generator when the weight of the car and counterweight cause the desired movement as long as the drive machine allows the drive sheave to be moved accordingly. Such regenerative drive machines typically operate on a three phase power input.

Active front end (AFE) converters in drives employ a pulse width modulated (PWM) switching rectifier to convert input AC power and provide DC power to a bus. Furthermore, inverter switching devices then convert the voltage DC bus to AC output currents to drive the load, e.g., motor. Such active front end converters are typically coupled with input filters, such as LCL filter circuits connected to each power phase. Since the front end rectifier is a switching circuit, the input filter operates to prevent introduction of unwanted harmonic content into the power grid. Filter components, including the filter inductors, and the converter switching devices are typically designed according to the power converter rating. Oversizing input filter components and switching devices adds cost to the system and occupies valuable enclosure space. In certain applications, it may be desirable to operate a higher voltage motor or other load even though the source voltage is low, for instance, a 400 V input voltage to drive a 460 V motor. In these situations, the active front end rectifier can be operated in boost mode to provide additional boost to increase the gain of the front end converter, thereby boosting the DC bus voltage. Likewise, under certain conditions it may be desirable to operate the inverter and motor at conditions where the current drawn from the DC bus is beyond rating, or the currents in the switching devices are beyond ratings. Active front and rectifiers/converters may also exhibit increased switching loss associated with operation of the converter switching devices under such conditions. Moreover, operation of an active front end power conversion system in boost mode may require an overall derating of the input and output capabilities of the converter. Specifically, the maximum output current available from the power converter may need to be reduced when the active front end is operated in boost mode in order to mitigate or avoid overheating the filter inductors and/or to reduce rectifier switching losses. However, such derating is inherently in efficient and may render a power conversion system unsuitable or not cost effective for a given application. Accordingly, there is a need for improved power converter apparatus and operating techniques to facilitate operation with an active front end while mitigating or avoiding thermal stress to filter inductors and/or rectifier switching losses to achieve improved power ratings.

BRIEF SUMMARY

According to an embodiment, described herein is a three-phase regenerative drive employing multiple converter pulse width modulation (PWM) strategies. The drive includes a three-phase converter having inputs for connection to a three-phase AC source, the three-phase converter having three phase legs, a DC bus operably connected to the three-phase converter wherein the three phase converter is configured to direct current from the three-phase AC source to the DC bus, and a three-phase inverter operably connected to the DC bus and a motor, the three phase inverter configured to draw current from the DC bus and provide three phase command signals to the motor. The three-phase converter employs a first PWM strategy to supply current to the DC bus, and the converter employs a second PWM strategy to supply current to the DC bus if a total current in the three phase legs exceeds a selected threshold.

In addition to one or more of the features described above or below, or as an alternative, further embodiments could include that each phase leg of the three phase legs of the three-phase converter includes a first and a second switching device, each of the thee phase legs having an emitter side resistor configured to sense phase current for each phase leg of the three phase legs.

In addition to one or more of the features described above or below, or as an alternative, further embodiments could include a controller for providing converter PWM signals to the three-phase converter based on at least one of the first PWM strategy and the second PWM strategy.

In addition to one or more of the features described above or below, or as an alternative, further embodiments could include that the first PWM strategy is based on at least one of a space vector PWM and a hybrid space vector PWM technique.

In addition to one or more of the features described above or below, or as an alternative, further embodiments could include that the second PWM strategy is based on at least one of a discontinuous PWM technique and a space vector PWM technique.

In addition to one or more of the features described above or below, or as an alternative, further embodiments could include that the controller is configured to generate inverter PWM control signals to the three-phase inverter.

In addition to one or more of the features described above or below, or as an alternative, further embodiments could include that the converter PWM control signals are at a different frequency than the inverter PWM control signals.

In addition to one or more of the features described above or below, or as an alternative, further embodiments could include that the converter PWM control signals are at twice the frequency than the inverter PWM control signals.

In addition to one or more of the features described above or below, or as an alternative, further embodiments could include a filter interposed between the AC source and the three-phase converter.

In addition to one or more of the features described above or below, or as an alternative, further embodiments could include that the filter comprises at least two series reactances configured to transfer current from the AC source to each phase leg of the three phase converter.

In addition to one or more of the features described above or below, or as an alternative, further embodiments could include that the converter PWM strategy provides a drive that is about 25% more efficient than a three-phase regenerative drive employing space vector PWM techniques alone.

Also described herein in an embodiment is a method of operating a three phase regenerative drive to drive a motor from a three phase AC source. The drive includes a three-phase converter, a three phase inverter, and a DC bus connected between the converter and the inverter. The drive also includes a controller, where the controller executes a method including: determining a current load on the DC bus; and controlling the three phase converter with a first pulse width modulation (PWM) technique to cause the three phase converter to supply power to the DC bus. The method also includes that if a current load on the DC bus exceeds a selected threshold, controlling the three-phase converter to employs a second PWM strategy to supply current to the DC bus.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The described subject matter is particularly pointed out and distinctly claimed in the claims at the conclusion of the specification. The foregoing and other features, and advantages are apparent from the following detailed description taken in conjunction with the accompanying drawings in which:

DETAILED DESCRIPTION

Figure 1:
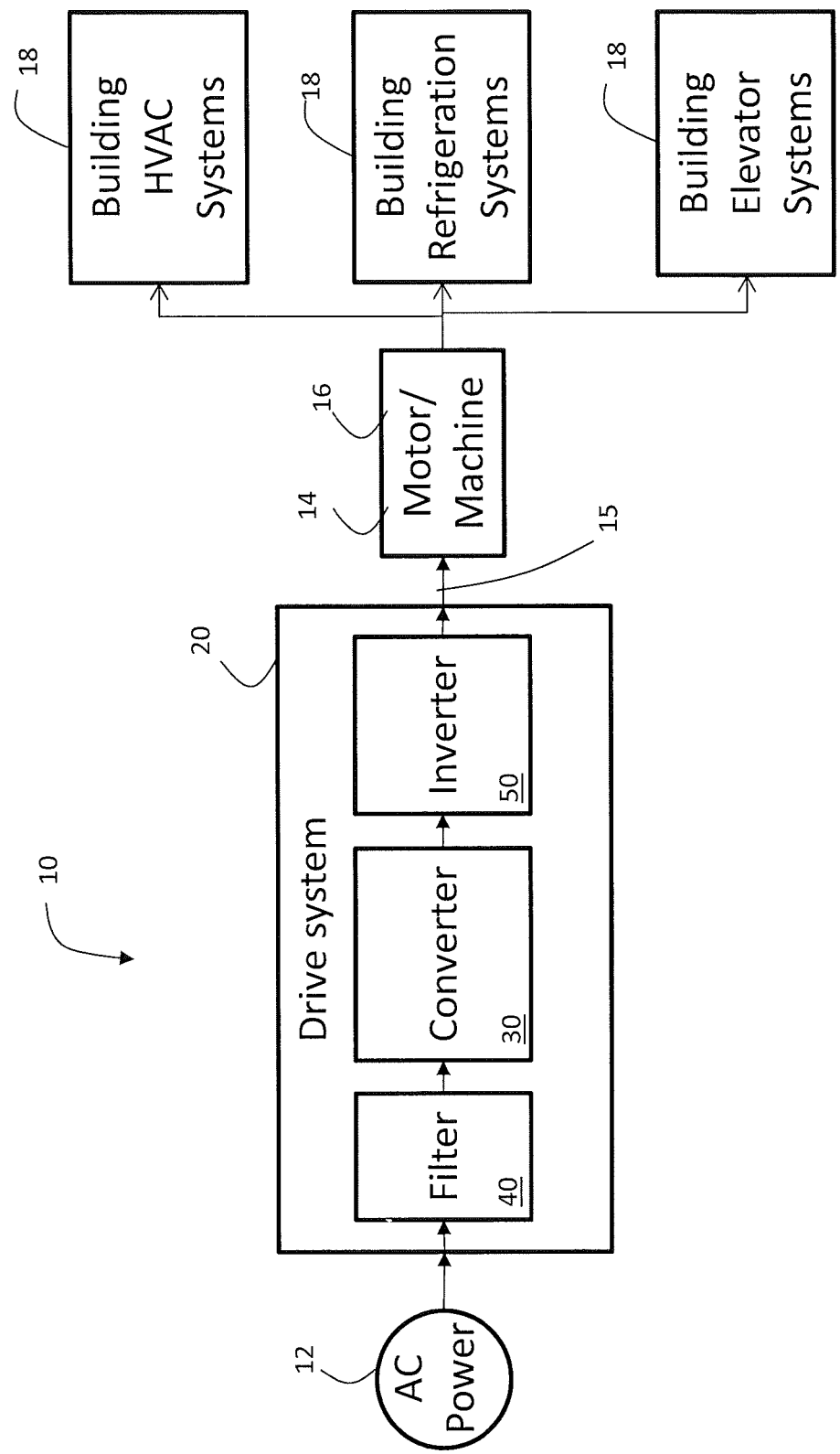
FIG. 1 is a block diagram of components of a motor drive system in accordance with an embodiment.

In general, embodiments herein relate to a regenerative drives employing an active converter to supply a DC bus that in turn supplies voltage to an inverter that generates motor excitation signals to drive a motor. The regenerative drives take advantage of the ability of an electric motor to act as a generator when the weight of the car and counterweight cause the desired movement as long as the drive machine allows the drive sheave to be moved accordingly. Such regenerative drive machines typically employ a three phase converter to supply a DC bus. Described her in several embodiments are techniques of controlling the switching devices of the converter to reduce switching losses under selected conditions and improve efficiency to enable operation in boost mode or beyond conventional ratings. Improvements in efficiency facilitate reductions in heat dissipated, and permit packaging size reductions.

Embodiments herein are directed to configuring and controlling the converter pulse width modulation (PWM) techniques under selected conditions. Embodiments herein set forth a drive and motor system and/or method for a converter to actively control a DC voltage typically generated from an AC side sinusoidal current. The DC voltage is employed to generate AC excitation voltage using fast switching of power electronics devices to control a motor. Moreover, switching of power electronics devices in active front-end rectifier also generates electromagnetic interference (EMI), which can pose potential problems for nearby and connected components. EMI filters are designed to attenuate EMI noise to satisfy the EMI standards, which are defined for particular applications, but EMI filters add weight and complexity for the rectifier system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In an embodiment, a three-phase drive operating from a three phase AC source is utilized in an electric motor system or power system. In one application, the power system is part of an elevator system. The elevator system also includes a hoistway having one or more of lanes or shafts. In each shaft, one or more elevator car travels to deliver passengers to a desired floor of a building. The electric motor system utilizes the power electronics inverter (e.g., as variable speed alternating drive (AC) motor drive) to improve the performance of maneuvering the elevator cars. Other applications and embodiments include powers systems for trains, boats, planes, etc.

Further, in another embodiment a three phase drive is used to drive a motor in a heating ventilation and air conditioning or refrigeration system HVAC/R system. The conventional HVAC/R system incorporates a closed refrigerant loop in a vapor compression cycle. The vapor-compression cycle uses a circulating refrigerant as the medium which absorbs and removes heat from the space to be cooled and subsequently rejects that heat elsewhere. All such systems have four basic components: a compressor, a condenser, a thermal expansion valve (also called a throttle valve or metering device), and an evaporator. In large scale HVAC systems or chillers, the compressor is large and driven by a very large motor requiring dedicated motor drives such as described herein with high voltage and current capabilities. In some instances the drive may include a converter that is a three-phase active front-end. The drive may also include a power electronics inverter (e.g., as a variable speed alternating current (AC) motor drive) to improve the performance of the chiller system. In an embodiment a three phase active converter operating from a three phase excitation and three phase inverter is used to drive a motor is disclosed.

FIG. 1 is a block diagram of components of a power system 10 as may be employed to power one or more building systems or loads 18. The power system 10 is described with respect to elevator system, however application to any system where a motor drive is employed may be envisioned. Power system 10 includes a source of AC power 12, such as an electrical main line (e.g., 440/220 volt, 1-phase). The AC power 12 is provided to a drive system 20. In addition, the drive system 20 may be configured as a conventional three phase drive operating from a three phase AC power source 12. The drive 20 may include a filter 40 configured to limit inrush currents, stabilizes voltage levels and suppress electromagnetic interference (EMI). The drive may also include a converter 30 to convert the AC power 12 to a DC voltage. Each drive also includes an inverter 50 to convert the DC voltage to multiphase, AC drive signals. Drive signals from the inverter 50 of the drive system 20 are supplied to a multiphase machine 14 to control a building system. For example, a motor 16 to impart motion to elevator car as part of the building system 18. In an exemplary embodiment, machine 14 includes a multiphase, permanent magnet synchronous motor 16. It should be appreciated, that while the embodiments herein are described primarily with reference to an elevator system and application, this description is for example only. The embodiments described here are readily applied to any application employing a three phase drive including HVAC, refrigeration and any other power system and motor control application as depicted in the figure.

Figure 2:
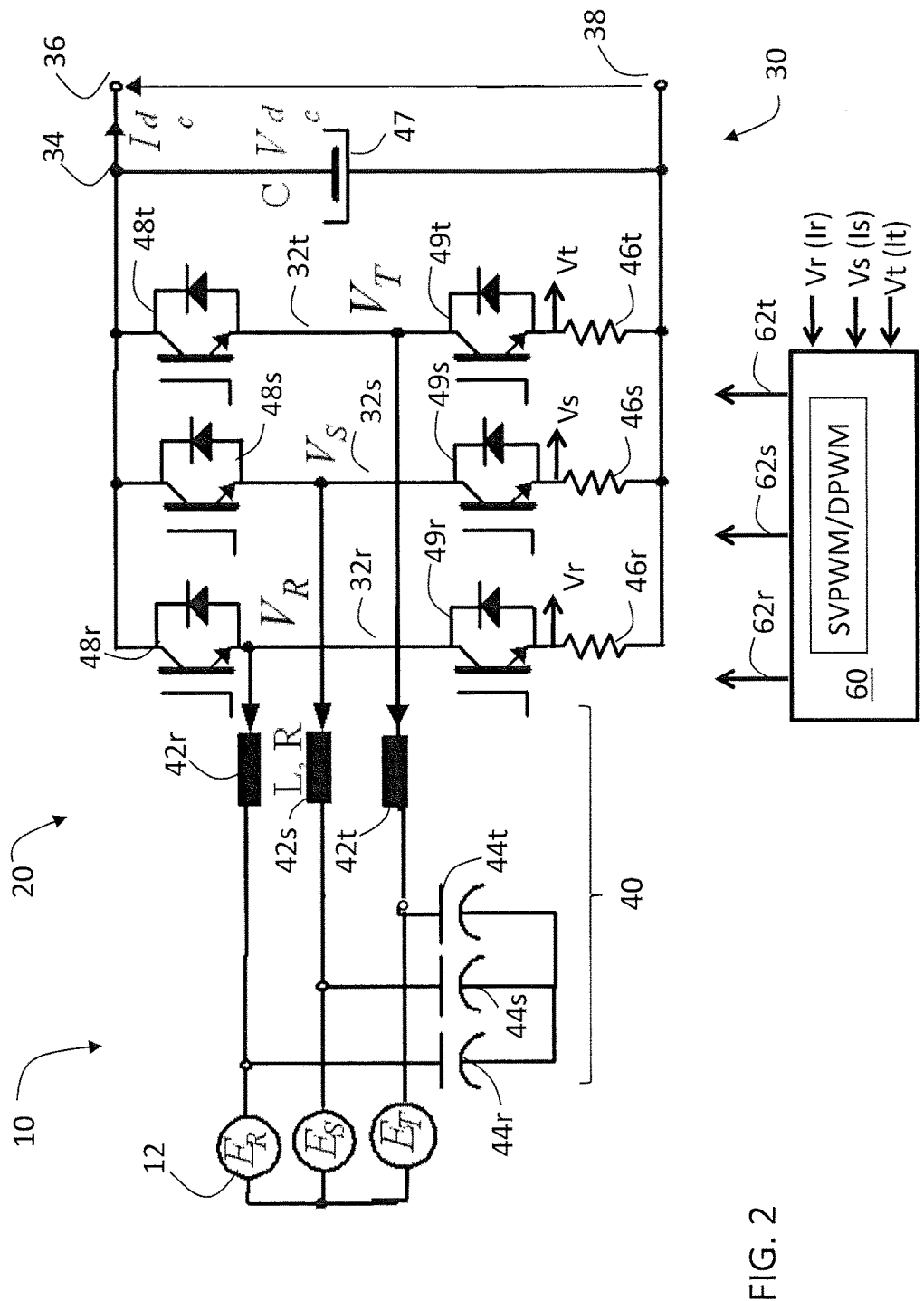
FIG. 2 is a simplified schematic of a 3 phase converter of three phase drive in accordance with an embodiment.

FIG. 2 is a simplified schematic of a power system 10 and drive 20 with a 3 phase drive converter as conventionally employed from a three phase excitation source 12 in the embodiments. The power system 10 includes a source of AC power 12, such as an electrical main line (e.g., 220 volt, 1-phase). Drive 20 includes a converter 30 having 3 phase legs, 32r, 32s, and 32t also denoted as R, S, and T respectively. Each phase leg, R, S, and T, (32r, 32s, and 32t) includes switching devices 48r, 49r; 48s, 49s; and 48t, 49t respectively controlled by control signals 62r, 62s, and 62t respectively from a drive controller (60) to convert AC power from the three phase excitation source 12 to DC power across a DC bus 34 with a positive terminal 36 with a negative terminal 38. The DC bus 34 may include a filter 47 to provide energy storage and current pulse filtering. The three-phase AC power source 12 is connected to a filter 40. The filter 40 receives current from the AC power source 12 directs it through inductive/reactive elements 42r, 42s, and 42t (e.g., inductors) and then connected to the three phase legs R, S, and T, (32r, 32s, and 32t) respectively of the converter 30. Conventionally, in such an application, the incoming current is the rectified in the R, S, and T phase leg 32r. 32s, and 32t respectively to supply the DC bus 34.

The drive system 20 once again includes a converter 30, to convert the AC power 12 to a DC voltage on the DC bus 34. Likewise each inductive/reactive element 42r, 42s, and 42t is also coupled to another reactive element 44r, 44s, and 44t (e.g., capacitors) connected in parallel and commonly connected as depicted. Filter 40 operates as a current transient/voltage suppression filter and for EMI suppression. In an embodiment, the filter 40 includes one or more line reactances and electromagnetic interference (EMI) capacitances. In addition, each of the three phase legs R, S, and T, (32r, 32s, and 32t) respectively of the converter 30 also includes an emitter based current sense resistor 46r, 46s, and 46t respectively. The current sense resistors 46r, 46s, and 46t are employed to measure and detect each of the currents in the phase legs R, S, and T, (32r, 32s, and 32t). Voltages denoted Vr, Vs, and Vt, developed across the current sense resistors 46r, 46s, and 46t are measured by the controller 60 for controlling the control signals to the switching devices 48r, 49r; 48s, 49s; and 48t, 49t respectively.

Continuing with FIGS. 1 and 2, the drive system 20 may further include an inverter 50 configured to draw power from the DC bus 34 and generate AC motor drive signals 15 (hereinafter motor drive signals) to drive the motor 16 (shown in FIG. 1) as is conventionally known. The inverter 50 conventionally having 3 phase legs. Each phase leg, includes switching devices controlled by control signals from a drive controller 60 in a conventional manner to convert DC power across the DC bus 34, to motor drive signals 15 to power motor 16 (See FIG. 1). The inverter 50, may be conventional for motor drives 20 employing at least six switching devices in three separate parallel legs, two switching devices per leg.

In an embodiment both converter 30 and inverter 50, are controlled by a controller 60. In an alternative embodiment, converter 30 and inverter 50 may be controlled by separate drive controllers, 60. Drive controller(s) 60 provides control signals 62r, 62s, 62t to the switching devices 48r, 49r; 48s, 49s; and 48t 49t of the R, S, and T phase legs 32r, 32s, and 32t respectively to control generation of the DC voltage on the DC buses 34. Likewise the controller 60 provides control signals (not shown) to the inverter 50 (FIG. 1) to control generation of the motor drive signals 15 to motor 16. Drive controller 60 may be implemented using a general-purpose microprocessor executing a computer program stored on a storage medium to perform the operations described herein. Alternatively, drive controller 60 may be implemented in hardware (e.g., ASIC, FPGA) or in a combination of hardware/software.

In operation the controller 60 develops a DC current command for the converter 30 based on the operation the motor 16 and the inverter 50 generating the motor drive signals 15. The DC current command is then employed to formulate the PWM control commands for the switching devices 48r, 49r; 48s, 49s; and 48t 49t of the R, S, and T phase legs 32r, 32s, and 32t respectively to provide a DC output current to the DC bus 34 accordingly. In addition, the controller 60 receives various input signals or values, including set point signals or values for desired output operation, such as motor speed, position, torque, etc., as well as feedback signals or values representing operational values of various portions of the motor drive 20. Among such signals may include, but not be limited to, DC bus voltage feedback signal representing the DC bus voltage in VDC, and a signal or value representing the line to line AC input voltage value as well a signal or signals indicative of the current in each of the phase legs R, S, and T phase legs 32r, 32s, and 32t respectively of the converter 30.

Conventionally a pulse width modulation (PWM) control scheme is employed to command the switching devices 48r, 49r; 48s, 49s; and 48t 49t of the R, S, and T phase legs 32r, 32s, and 32t respectively of the converter 30. Likewise, a similar a pulse width modulation (PWM) control scheme is employed to command the switching devices of each of the three phase legs of the inverter 50 to generate and control the motor drive signals 15 to the motor 16. Conventionally, such a PWM control scheme employs space vector pulse width modulation SVPWM techniques for both the converter 30 and inverter 50. Moreover, conventionally the SVPWM for the converter 30 and inverter 50 would be operated at the same frequency and synchronized. Synchronization of the PWM for both the converter 30 and the inverter 50 improves functions and reduces generated EMI from the operation of the switching devices (e.g., 48r, 49r; 48s, 49s; and 48t 49t of the converter 30).

However, in some applications, particularly where the emitter side phase current sense resistors 46r, 46s, and 46t are employed for cost savings, other PWM techniques may be employed to address the advantages and constraints imposed by the emitter side phase current sense resistors 46r, 46s, and 46t. For example, the application of emitter side phase current sense resistors 46r, 46s, and 46t dictates the use of minimum on-times for the lower switching devices e.g., 49r; 49s; and 49t of the R, S, and T phase legs 32r, 32s, and 32t of the converter 30 where sense resistor is located in order to make the current measurement, this may make some PWM techniques less suitable than others. Moreover, while it is well known that increasing switching frequency facilitates reductions in the size of magnetics, filters, improves acoustics, and the like, though it does result in increased switching losses in the switching devices of the inverter 50 and/or converter 30, e.g., 49r; 48s, 49s; and 48t 49t. Therefore, in some embodiments, it may be advantageous to operate the converter switching devices 48r, 49r; 48s, 49s; and 48t 49t at a different (e.g., higher) PWM frequency than the inverter 50.

Increased switching losses and longer required on-times for the switching devices 48r, 49r; 48s, 49s; and 48t 49t increase losses and reduces efficiency causing the devices to potentially overheat. As a result, while SVPWM is effective for most applications and facilitates current sensing when employing the emitter side sense resistors 46r, 46s, and 46t in the converter R, S, and T phase legs 32r, 32s, and 32t, it is less efficient. Conversely, employing conventional discontinuous (DPWM) (as depicted in FIG. 3C) improves efficiency, but makes measuring the current impossible in a selected phase legs 32r, 32s, and 32t, when a given lower switching device 49r; 49s; and 49t associated with that particular phase leg 32r, 32s, and 32t is not conducting. DPWM, advantageously, can be used at the expense of current sensing quality. In DPWM, current sensing is achieved via calculation via known method of negative sum of the two remaining) for the particular phase leg 32r, 32s, 32t that has a turned off lower switching device e.g. one of 49r, 49s, 49t from the other two phase legs. This computed phase current unfortunately results in some current distortion, acoustic noise, and the like. As a result, to protect the switching devices (e.g., 48r, 49r; 48s, 49s; and 48t 49t) magnetics and the like, DPWM is generally only be used in application where current control or distortion is less important, and for short applications of high current (e.g., peak converter currents) periods of time.

Hybrid SVPWM is effectively a combination or hybrid of SVPWM and DPWM techniques. Hybrid SVPWM allows the lower switching device(s) (e.g., 49r, 49s, 49t to be ON, i.e., switching, for a more prolonged time (e.g., on the order of about ⅔ of the AC voltage cycle), but it also includes a period of time where the lower switching devices 49r, 49s, 49t are off. Therefore, it allows for both emitter series current sensing and facilitates reduced switching losses. The reduced switching losses are achieved due to the switching being interrupted (e.g., approximately ⅓ of an AC voltage cycle). Hence, in an embodiment the base PWM switching scheme in the converter 30 is hybrid SVPWM, while at peak converter current loading the control scheme transitions to DPWM.

Moreover for the inverter 50, in applications where torque/current control are important, low current distortion (and thereby low torque ripple) is desired. As such, continuous SVPWM or hybrid SVPWM techniques are employed to ensure good motor response and better ride quality (in elevator applications). In addition, for the converter 30, continuous SVPWM or hybrid SVPWM techniques are employed to ensure good motor response and better ride quality (in elevator applications). In applications were current control are less critical and efficiency is more important, a technique to reduce switching losses and improve efficiency in accordance with an embodiment are employed.

In particular, under selected conditions, the PWM scheme employed for the converter 30 is switched from a more conventional SVPWM or hybrid SVPWM to a discontinuous PWM (DPWM) strategy. More specifically, under selected conditions where the load on motor 16 and thereby the DC bus 34 is highest, e.g., starting, acceleration, deceleration, emergency conditions of the motor 16, DPWM is employed to achieve lower switching losses. Employing DPWM reduces the switching losses in the switching devices 48r, 49r; 48s, 49s; and 48t 49t of the R, S, and T phase legs 32r, 32s, and 32t respectively. Reductions in switching losses improves power efficiency and thereby enables higher power densities and enables higher operating powers and facilitates downsizing of expensive power components such as the switching devices 48r, 49r; 48s, 49s; and 48t 49t of the R, S, and T phase legs 32r, 32s, and 32t. However, employing DPWM makes measuring the current impossible at times when emitter side sense resistors 46r, 46s, and 46t are employed. More specifically, when a particular phase leg phase 32r, 32s, and 32t lower switching device 49r; 49s; or 49t is inactive measurement of current in that phase leg 32r, 32s, and 32t is not possible.

The described embodiments advantageously employ SVPWM or hybrid SVPWM over a selected portion of the operational range of the DC bus loading and selectively switches to DPWM for instances of higher current loading, thereby providing potentially optimal converter output current rating during selected high current loading conditions.

This, in turn, allows a given motor drive 20 or other power conversion system 10 to be used with minimal output limitations on motor acceleration or derating penalty in situations in which available input voltages may not match be sufficient the AC for the drive 10 or there is excessive current in filter magnetics. For instance, a motor drive 20 designed for 480 V three-phase AC input voltages may be successfully employed in situations in which 380 V AC input is available, with the active front end operated in boost mode, and the disclosed control apparatus and techniques allowing the drive 10 to operate at the highest possible output rating without thermally stressing input filter inductors and without incurring excessive rectifier switching loss penalties. The present disclosure thus includes embodiments that provide intelligent balancing of operation at or above component rating under selected operating conditions in the power conversion system 10, in this case, a filter magnetic current rating at an acceptable operating point with respect to thermal stress on the inductor core structures, and more specifically a pulse width modulation strategy to reduce converter switching device switching losses. As a result, improved power converter performance is achieved beyond that attainable using conventional drive rating and operating techniques and controllers.

In another embodiment, under selected conditions, the PWM scheme employed for the converter 30 is switched from a more conventional hybrid SVPWM to SVPWM or a discontinuous PWM (DPWM) strategy. More specifically, under selected conditions where the load on motor 16 and thereby the DC bus 34 is highest, DPWM is employed to achieve lower switching losses as described above. Employing DPWM reduces the switching losses in the switching devices 48r, 49r; 48s, 49s; and 48t 49t of the R, S, and T phase legs 32r, 32s, and 32t respectively. However, as stated above, employing DPWM makes measuring the current impossible at times when emitter side sense resistors 46r, 46s, and 46t are employed. In addition, employing DPWM results in thermal imbalances in the switching devices 48r, 49r; 48s, 49s; and 48t 49t of the R, S, and T phase legs 32r, 32s, and 32t respectively. In some instances, this thermal imbalance may be undesirable. As such, for selected instances, it may be desirable to employ SWPWM to ensure improved thermal balance for the switching devices 48r, 49r; 48s, 49s; and 48t 49t.

The described embodiments advantageously employ hybrid SVPWM over a selected portion of the operational range of the DC bus loading and selectively switches to DPWM or SVPWM for instances of higher current loading, thereby providing potentially optimal converter output current rating during selected high current loading conditions. This, in turn, allows a given motor drive 20 or other power conversion system 10 to be used with minimal output limitations on motor acceleration or derating penalty in situations in which available input voltages may not match be sufficient the AC for the drive 10 or there is excessive current in filter magnetics. For instance, a motor drive 20 may be successfully employed in situations allowing the drive 10 to operate at the highest possible output rating without thermally stressing input filter inductors and/or switching devices 48r, 49r; 48s, 49s; and 48t 49t and without incurring excessive switching loss penalties in the switching devices 48r, 49r; 48s, 49s; and 48t 49t.

The present disclosure thus includes embodiments that provide intelligent balancing of operation at or above component rating under selected operating conditions in the power conversion system 10, in this case, a filter magnetic current rating at an acceptable operating point with respect to thermal stress on the inductor core structures, and more specifically a pulse width modulation strategy to reduce converter switching device switching losses. As a result, improved power converter performance is achieved beyond that attainable using conventional drive rating and operating techniques and controllers.

In particular embodiments, as described further below, the switchover from SVPWM or hybrid SVPWM rectifier operation to DPWM is strategically determined according to the factors such as the DC bus 34 voltage and current loading. The controller 60 adjusts PWM technique to improve efficiency and thereby maintain the desired DC bus output current based on the operation of the inverter 50. In this manner, the rating of the motor drive 20 is selectively "modified" such that the rectifier DC output current can exceed selected rating (or maintain rating) under certain conditions thereby rendering the drive 10 applicable to a wider range of field installation situations. As a result, the filter inductors L 42r, 42s, 42t and other current sensitive components are protected from thermal stresses while also protecting the converter switching devices 48r, 49r; 48s, 49s; and 48t 49t of the R, S, and T phase legs 32r, 32s, and 32t respectively from excessive switching losses. Using these novel techniques, moreover, the filter inductors 42r, 42s, 42t and the rectifier switches 48r, 49r; 48s, 49s; and 48t 49t respectively need not be oversized, and the system can operate intermittently or even continuously at or beyond rating for the converter 30 without triggering undesirable shutdowns. Moreover, the disclosed concepts facilitate use of motor drives 20 and other power conversion systems 10 in applications that would otherwise exceed the ratings of the components of the converter 20. Thus, the converter controller 60 provides an intelligent balancing of the interrelationship between design considerations for the power converter 10 and specific field applications requiring additional converter current capability, which balance was not possible using conventional control approaches.

It should be noted that in an embodiment, the inverter 50 typically utilizes SVPWM to provide smooth current/torque control of the motor 16. On the other hand, the converter 30 typically uses hybrid SVPWM (at a higher PWM frequency) to minimize switching losses. Based on total phase current sensing denoted as Ir, Is, and It (Vr, Vs, Vt across the sense resistors 46r, 46s, 46t) exceeding rated peak converter currents, in some embodiments the PWM control switches to DPWM to reduce switching losses, while in others the algorithm switches to SVPWM to balance the thermal distribution of the power switches while maintaining low current harmonics and acoustic noise. Note again, while SVPWM generates more losses than hybrid SVPWM or DPWM, it operates in a more balanced fashion hence it is acceptable for short period of time of converter currents going beyond rated acceleration current.

Figure 3A:
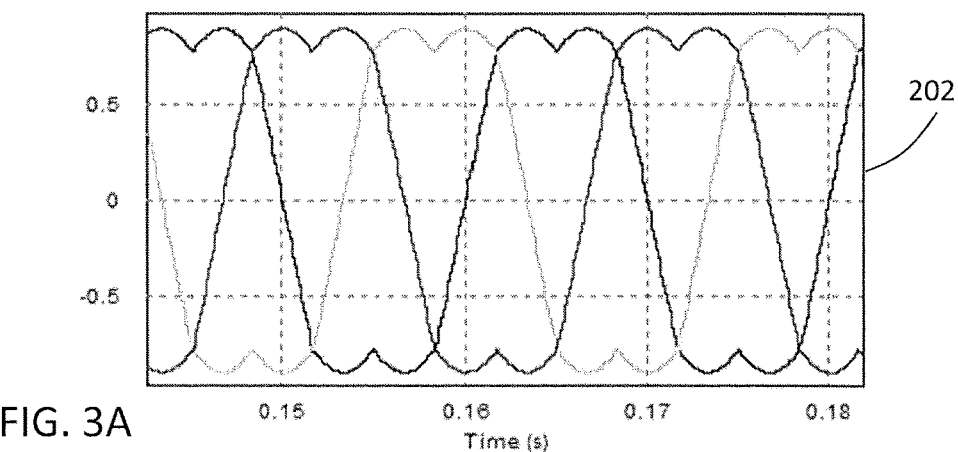
FIG. 3A is a diagram and graph of a PWM waveform of conventional SVPWM in accordance with an embodiment.
Figure 3B:
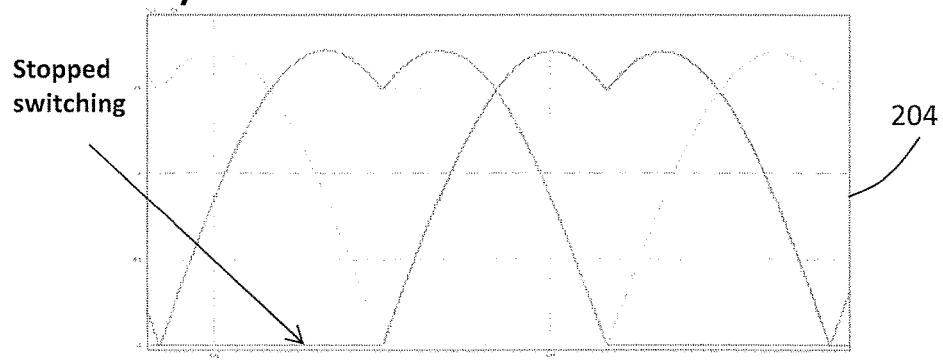
FIG. 3B is diagram and graph of a PWM waveform of a conventional hybrid for SVPWM in accordance with an embodiment.
Figure 3C:
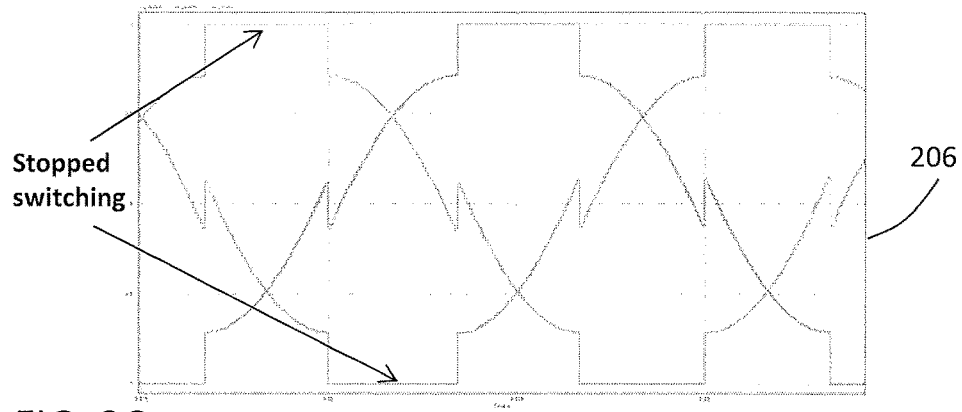
FIG. 3C is diagram and graph of a PWM waveform of conventional DPWM in accordance with an embodiment.

Referring also to FIGS. 3A-3C, which further illustrate graphs 202, 204, and 206 showing operation of certain embodiments of the controller 60 in which a hybrid SVPWM and SVPWM technique is provided by the controller 60. FIG. 3A illustrates an exemplary graph 202 showing three-phase carrier waveforms employing conventional SVPWM as may commonly be employed in a motor drive converter 30 or inverter 50. In an embodiment a hybrid of the conventional SVPWM is employed as depicted in FIG. 3B at graph 204, where the switching is stopped in each of the phase legs switching devices 48r, 49r; 48s, 49s; and 48t 49t of the R, S, and T phase legs 32r, 32s, and 32t respectively. For example, in reference to figures, when the signal indicates −1, it means that the lower switching device e.g., 49r for the R phase leg 32r, is fully turned on while the top switching device, e.g., 48r for that leg (e.g., 32r) is fully off during the PWM period. Conversely, when the signal indicates 1, it means that the bottom switching device e.g., 49r for the R phase leg 32r, is fully turned off while the top switching device e.g., 48r for that leg (e.g., 32r) is fully on during the PWM period. If the signal is between −1 & 1, then the switching device pairs e.g., 48r, 49r for the R phase leg 32r toggle twice within the PWM period.

FIG. 3C in graph 206 depicts three-phase carrier waveforms employing discontinuous pulse width modulation which clamps the carrier at the maximal or minimal levels (e.g., +1.0 and −1.0 in this example) over an angular range constituting the DPWM angle 210. In this embodiment, the DPWM angle 210 is provided by the controller 60 based on the current loading of the DC bus 34. The PWM commands 62r, 62s, 62t to the to the switching devices 48r, 49r; 48s, 49s; and 48t 49t of the R, S, and T phase legs 32r, 32s, and 32t respectively use the discontinuous pulse width modulation operation of the converter 30 in the first boost mode range 204 (FIG. 3). In addition, the controller selectively adjusts the DPWM angle/duration based on the current loading of the DC bus, to avoid filter magnetics overcurrent and the current ratings of the switching devices 48r, 49r; 48s, 49s; and 48t 49t. In addition, controller 60 selectively increases the DPWM angle 210 with increasing DC bus current. For example in an embodiment, a linear increase from 0° to 60°. The crossover location 212 at which the control changes over from hybrid/continuous space vector pulse width modulation to DPWM at a selected current level for the DC bus. It should be appreciated that while a linear relationship between current loading and DPWM angle is described for the purposes of illustration, other adjustment profiles and curves may be used, including curvilinear, stepped adjustments, etc.

Figure 4:
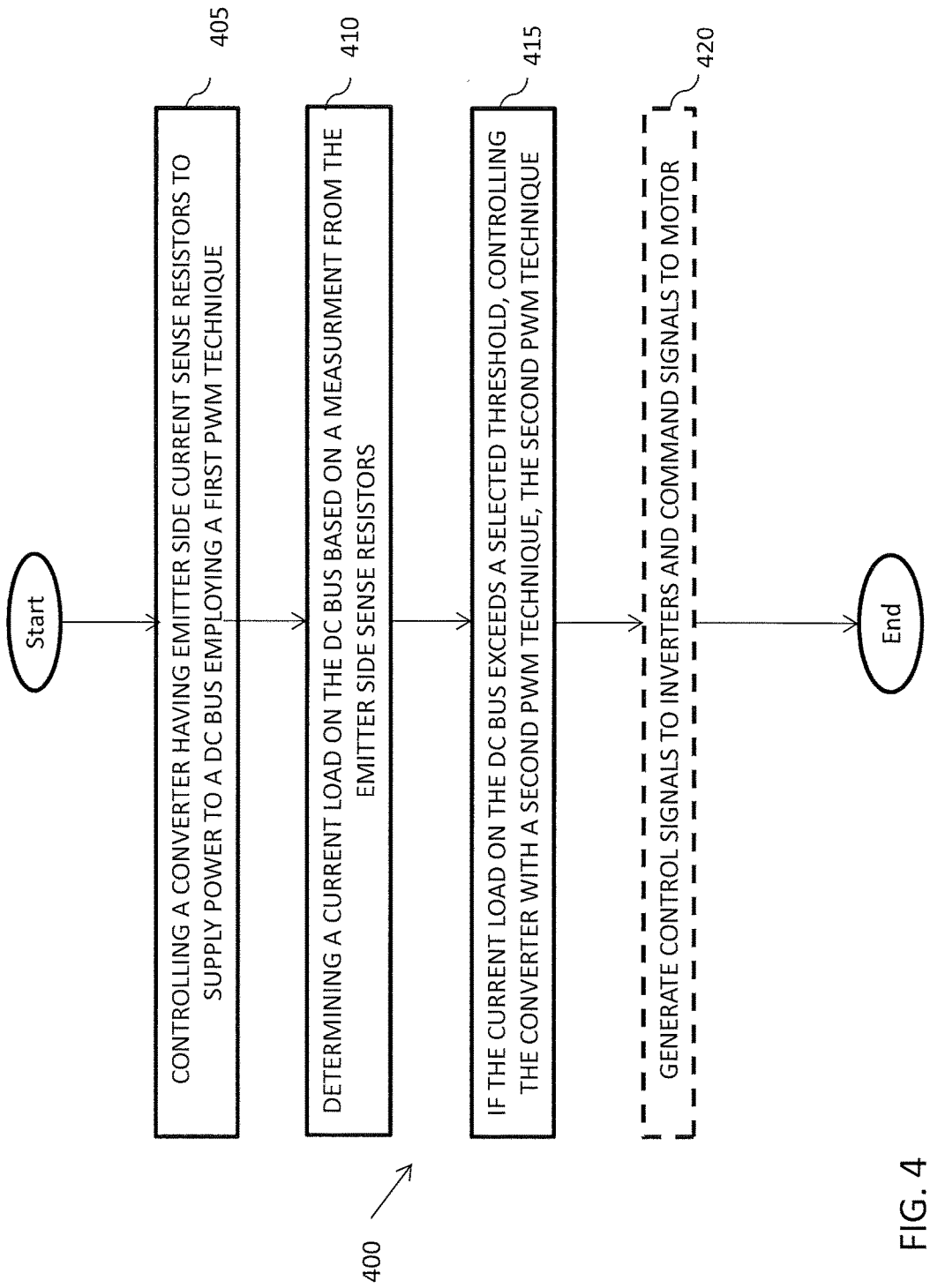
FIG. 4 depicts a flowchart of a method of controlling is a three-phase regenerative drive employing multiple converter pulse width modulation (PWM) strategies in accordance with an embodiment.

Turning now to FIG. 4, where a control methodology 400 for the drive 20 is depicted. For simplicity, reference is made to drive 20 of FIG. 2 and its various elements, while it should be appreciated the description may be equally applicable to the other embodiments employing different drive configurations. In the various embodiments, reference will be made to controlling both the converter 30 as well as the inverter 50. In some instances similar schemes may be employed to control the converter 30 as well as the inverter 50 whether with multiple controllers 60, or the use of a single controller 60. In other instances different control schemes may be employed.

In an embodiment, the converter 30 is controlled when connected as depicted in FIG. 2, the control method employed is to simply operate the R, S, and T phase legs 32r, 32s, and 32t in a conventional manner, with the inverter 50 excited by the DC bus voltage formulating the motor drive signals 15 and the converter 30 rectifying/converting the AC power source 12 to supply power to the DC bus 34. The PWM duty cycles for the commands signals 62r, and 62s to R and S phase legs 32r, 32s respectively are controlled with a proportional integral controller algorithm. The switching devices 48r, 49r; 48s, 49s; and 48t, 49t operating at the PWM frequency, e.g., on the order of 10-100 kHz as is conventionally understood. It should be appreciated that in some embodiments the control scheme for the converter 30 may be linked to the control scheme of the inverter 50. The control scheme employed may depend on the particular drive topology employed, the configuration of the system and selected design constraints.

Continuing with FIG. 4, the method initiates at process step 405 with connecting the three phase converter 30 of three phase drive 20 of FIG. 2 to a three phase AC source 12 as described herein and then controlling the converter 30 with a hybrid SVPWM technique to supply energy to the DC bus 34. The switching devices 48r, 49r; 48s, 49s; 48t, 49t; of the R, S, and T phase legs 32r, 32s, and 32t are controlled in an manner to rectify the incoming current from the AC source 12 and direct it to the DC bus 34. At process step 410 the current load on the DC bus is determined by monitoring the voltage developed across the emitter sense resistors 46r, 46s, and 46t of the three phase legs 32r, 32s, and 32t respectively. Advantageously, as described earlier, this approach provides for a more efficient cost effective current sensing scheme that facilitates determination of the current load on the DC bus 34. Once phase currents are known via the emitter side phase current sensors 46r, 46s, and 46t and via the dc bus voltage sense, conventional techniques are employed to control a regenerative converter control based on those currents to maintain sufficient voltage levels on the DC bus 34. If the current load on the DC bus exceeds a selected threshold, the then PWM control technique for the converter 30 transitions to a DPWM technique to supply energy to the DC bus 34 as depicted at process step 415. Transitioning to DPWM reduces switching losses in the converter switching devices 48r, 49r; 48s, 49s; 48t, 49t facilitating more efficient operation. Continuing with the method 400, optionally the drive may include generating control signals to control the operation of the switching devices of the inverter 50 in a manner to generate motor drive signals 15 for the motor 16. In and embodiment, the methodology 400 may further include interposing a filter 40 between the AC source 12 and the three phase converter 30.

Therefore, it should be understood and appreciated a technical effect of the described embodiments includes changing the PWM scheme from SVPWM or hybrid SVPWM to DPWM, which improves converter function in terms of losses and over all converter efficiency. The change may at times be at the expense of acoustic noise and/or current distortion to levels that may be acceptable in some applications. However, it is also desirable to employ SVPWM under selected conditions to reduce current distortion/acoustic noise, and provide improved balanced thermal distribution of switching devices over the hybrid PWM or DPWM for acoustically sensitive applications.

The terminology used herein is for the purpose of describing particular embodiments only and is not intended to be limiting. While the description has been presented for purposes of illustration and description, it is not intended to be exhaustive or limited to the form disclosed. Many modifications, variations, alterations, substitutions, or equivalent arrangement not hereto described will be apparent to those of ordinary skill in the art without departing from the scope of the disclosure. Additionally, while the various embodiments have been described, it is to be understood that aspects may include only some of the described embodiments. Accordingly, embodiments are not to be seen as being limited by the foregoing description, but is only limited by the scope of the appended claims.

What is claimed is:

1. A three-phase regenerative drive employing multiple converter pulse width modulation (PWM) strategies, the drive comprising:

a three-phase converter having inputs for connection to a three-phase AC source, the three-phase converter having three phase legs;

a DC bus operably connected to the three-phase converter wherein the three phase converter is configured to direct current from the three-phase AC source to the DC bus;

a three-phase inverter operably connected to the DC bus and a motor, the three phase inverter configured to draw current from the DC bus and provide three phase command signals to the motor; and wherein the three-phase converter employs a first PWM strategy to supply current to the DC bus, and the three-phase converter employs a second PWM strategy to supply current to the DC bus if a total current in the three phase legs exceeds a selected current threshold.

2. The three-phase regenerative drive of claim 1, wherein the each phase leg of the three phase legs of the three-phase converter includes a first and a second switching device, each of the thee phase legs having an emitter side resistor configured to sense phase current for each phase leg of the three phase legs.

3. The three-phase regenerative drive of claim 1, further including a controller for providing converter PWM signals to the three-phase converter based on at least one of the first PWM strategy and the second PWM strategy.

4. The three-phase regenerative drive of claim 3, wherein the first PWM strategy is based on at least one of a space vector PWM and a hybrid space vector PWM technique.

5. The three-phase regenerative drive of claim 3, further including the controller configured to generate inverter PWM control signals to the three-phase inverter.

6. The three-phase regenerative drive of claim 5, wherein the converter PWM control signals are at a different frequency than the inverter PWM control signals.

7. The three-phase regenerative drive of claim 6, wherein the converter PWM control signals are at twice the frequency than the inverter PWM control signals.

8. The three-phase regenerative drive of claim 1, wherein the second PWM strategy is based on at least one of a discontinuous PWM technique and a space vector PWM technique.

9. The three-phase regenerative drive of claim 1, further comprising a filter interposed between the AC source and the three-phase converter.

10. The three-phase regenerative drive of claim 9 wherein the filter comprises at least two series reactances configured to transfer current from the AC source to each phase leg of the three phase converter.

11. The three-phase regenerative drive of claim 1, wherein the converter PWM strategy provides a drive that is about 25% more efficient than a three-phase regenerative drive employing space vector PWM techniques alone.

12. A method of operating a three phase regenerative drive to drive a motor from a three phase AC source, the drive comprising a three-phase converter having three phase legs, a three phase inverter, and a DC bus connected between the converter and the inverter, and a controller, the controller executing the method comprising:

determining a total current in the three phase legs;

controlling the three phase converter with a first pulse width modulation (PWM) technique to cause the three phase converter to supply power to the DC bus;

if a total current in the three phase legs exceeds a selected threshold, controlling the three-phase converter to employs a second PWM strategy to supply current to the DC bus.

13. The method of claim 12, wherein the each phase leg of the three phase legs of the three-phase converter includes a first and a second switching device, each of the thee phase legs having an emitter side resistor, wherein the measuring is based on a voltage induced on the emitter side sense resistors.

14. The method of claim 12, further including the controller providing converter PWM control signals to the three-phase converter based on at least one of the first PWM strategy and the second PWM strategy.

15. The method of claim 14, wherein the wherein the first PWM strategy is based on at least one of a space vector PWM and a hybrid space vector PWM technique.

16. The method of claim 12, wherein the second PWM strategy is based on at least one of a discontinuous PWM technique and a space vector PWM technique.

17. The method of claim 12, further including generating inverter PWM control signals to the three-phase inverter to generate three phase command signals from the DC bus to supply the motor.

18. The method of claim 17, wherein the converter PWM control signals are at a different frequency than the inverter PWM control signals.

19. The method of claim 12, wherein the converter PWM control signals are at twice the frequency than the inverter PWM control signals.

20. The method of claim 12, further comprising interposing a filter between the AC source and the three-phase converter.

21. The method of claim 20 wherein the filter comprises at least two series reactances configured to transfer current from the AC source to each phase leg of the three phase converter.

22. The method of claim 12 further including, wherein the converter PWM strategy provides a drive that is about 25% more efficient than a three-phase regenerative drive employing space vector PWM techniques alone.

* * * * *